(12) United States Patent
Ruppert

(10) Patent No.: US 12,122,197 B2
(45) Date of Patent: Oct. 22, 2024

(54) EXTENDED-LIFE TIRE CHAIN AND METHOD OF EXTENDING THE LIFE OF A TIRE CHAIN

(71) Applicant: Tim Ruppert, Truckee, CA (US)

(72) Inventor: Tim Ruppert, Truckee, CA (US)

( * ) Notice: Subject to any disclaimer, the term of this patent is extended or adjusted under 35 U.S.C. 154(b) by 977 days.

(21) Appl. No.: 17/024,390

(22) Filed: Sep. 17, 2020

(65) Prior Publication Data
US 2022/0080791 A1    Mar. 17, 2022

(51) Int. Cl.
| | | |
|---|---|---|
| *B60C 27/06* | (2006.01) | |
| *B60C 27/08* | (2006.01) | |
| *F16G 13/04* | (2006.01) | |
| *F16G 15/04* | (2006.01) | |

(52) U.S. Cl.
CPC ............ *B60C 27/062* (2013.01); *B60C 27/06* (2013.01); *B60C 27/086* (2013.01); *F16G 13/04* (2013.01); *F16G 15/04* (2013.01)

(58) Field of Classification Search
CPC ..... B60C 27/06; B60C 27/061; B60C 27/062; B60C 27/067; B60C 27/068; B60C 27/08; B60C 27/086; F16G 15/10; F16G 15/04
See application file for complete search history.

(56) References Cited

U.S. PATENT DOCUMENTS

| | | | |
|---|---|---|---|
| 3,559,713 A | | 2/1971 | Mueller et al. |
| 3,714,975 A | | 2/1973 | Muller |
| 3,799,232 A | | 3/1974 | Schnurle |
| 4,649,977 A | | 3/1987 | Weidler |
| 5,641,213 A | * | 6/1997 | Arsenault ............. B62D 55/04 305/196 |

FOREIGN PATENT DOCUMENTS

| | | | | |
|---|---|---|---|---|
| CA | 2733471 A1 | * | 9/2011 | ............ B60C 27/06 |
| DE | 2221633 | | 11/1973 | |
| DE | 2262591 | | 7/1974 | |
| DE | 202017103313 U1 | * | 10/2018 | ............ B60C 27/06 |
| EP | 0049570 A2 | * | 4/1982 | ............ B60C 27/08 |
| GB | 190709230 | | 7/1907 | |

OTHER PUBLICATIONS

Translation of DE-202017103313 (Year: 2018).*
Cardinal Search Report re: PLink for Tire Chains for Use on SNow and Ice, Especially for Use on Large Tires; Jan. 21, 2020.

* cited by examiner

*Primary Examiner* — Bobby Yeonjin Kim
(74) *Attorney, Agent, or Firm* — Holland & Hart LLP

(57) ABSTRACT

An extended-life tire chain and method of extending the life of a tire chain. An extended-life tire chain has a plurality of chain links, a plurality of twin clevises each secured to two of the links, and a plurality of clevis pins each having a head on one of its extremities. Each twin clevis has two receptacles. Each clevis pin is removably disposed in a different one of the receptacles. The twin clevises are oriented such that, when the tire chain is installed on a tire, the heads project radially away from a tread surface of the tire.

21 Claims, 13 Drawing Sheets

EXTENDED-LIFE TIRE CHAIN AND METHOD OF EXTENDING THE LIFE OF A TIRE CHAIN

FIELD OF THE INVENTION

This invention is in the field of tire chains for use on motor vehicle tires in conditions of poor weather such as deep mud, snow, and ice.

BACKGROUND

Tire chains are commonly installed on vehicle tires to improve traction and reduce skidding when road conditions have deteriorated due to such factors as snow, ice, or mud. Chains are used not only on passenger cars but also on larger vehicles and equipment including trucks, snowplows, wheel loaders, tractors, bulldozers, and the like. Tires on these larger vehicles may range up to two meters (6.6 feet) or more in diameter. Regardless of size, a tire chain typically consists of chain links of steel or other hard metal interconnected in various ways to encircle the tire and come between the tire tread and the road surface.

A portion of one kind of tire chain that is often used on tires of large equipment and vehicles is illustrated in FIG. 1. The figure shows a portion of a tire generally 100 having tread sections 102 that project outwardly from the tire 100. When no chain is installed on the tire, the tread sections engage a surface of a road. The tread sections 102 define channels for water on the road to escape and thereby enable the tire to remain in frictional engagement with the road, but this does not give adequate traction in snowy or icy conditions or in deep mud. To improve traction in such conditions, a tire chain is installed over the tread sections 102. The chain consists of interconnected chain links 104 and couplers 106. The couplers 106 have projections 108 oriented to project radially away from the tire surface to engage the road and provide traction despite poor weather conditions.

SUMMARY

The Applicant believes that he has discovered problems with the state of the art as outlined above. Due to the great weight of large vehicles and equipment and the large torque exerted by such machines through the tires to the road, especially at low speeds, the projections 108 wear rapidly, reducing the effectiveness of the chains. Also, the projections 108 are subject to breakage caused by road conditions such as potholes, uneven pavement, and rocks or other foreign objects on the road surface. Repairing or replacing these projections is difficult at best. When these parts wear and break, the tire chain must often be replaced in its entirety, an expensive and time-consuming process for large vehicles.

Briefly and in general terms, one embodiment of an extended-life tire chain has a set of chain links and a set of twin clevises, each clevis secured to two of the links. Each twin clevis has two receptacles. A clevis pin with a head on one of its extremities is removably disposed in each receptacle. The twin clevises are oriented such that, when the tire chain is installed on a tire, the heads project radially away from a tread surface of the tire.

In use, the heads of the removable clevis pins contact the road surface. As the clevis pins wear out, they can easily and quickly be replaced. This greatly extends the life of the tire chain and thereby reduces downtime for chain replacement. In some instances, there may be no need to replace the tire chain at all for a much longer period of time.

Retainer clips, sometimes called C-clips, may be used to secure the clevis pins in the receptacles. In one embodiment each clevis pin has a recessed section of its shank, and a retainer clip is clipped onto the shank in the recessed section, partially or fully encircling the shank, before the clevis pin is inserted into the clevis. The retainer clip itself is spring tensioned and has on its distal end a plurality of teeth that are compressed during insertion of the clevis pin, springing outward from the shank as the clevis pin reaches full insertion, retaining the clevis pin in the clevis. In some embodiments the teeth may be carried by the clevis pin directly, without a retainer clip. In some embodiments the retainer clips are made of spring steel or other spring material. When the clevis pin is worn or damaged it can be removed with a tool that automatically compresses the retainer clip and forces the clevis pin out, or by striking its distal end with a hammer.

In other embodiments the retainer clips may have pins to hold them in place, or the clips may be slightly larger in outer diameter than the clevis pins. Retaining rings, also called E-clips, may instead be used. Or the clevis pins may be secured by cotter pins. In some embodiments the clevis pins comprise threaded bolts that may be secured either by nuts or by screwing them into mating threads cut in the sidewalls of the receptacles. The bolts may have hex heads, Allen-wrench heads, or heads that can be driven by other tools.

In another embodiment, an extended-life tire chain has a plurality of chain links and a plurality of twin clevises each having two pairs of arms. Each pair of arms defines therebetween a U-shaped opening and a receptacle for a clevis pin extends through one or both of the arms. Each twin clevis encircles one of the chain links in one of its U-shaped openings and another of the chain links in the other of its U-shaped openings such that the twin clevises and chain links together define a tire chain structure shaped to cover a tread surface of a tire. The chain links are oriented generally parallel the tread surface and the twin clevises are oriented generally perpendicular to the tread surface. The tire chain includes a plurality of clevis pins each with a head on one of its extremities and each removably disposed in a receptacle in a different one of the pairs of arms to retain a chain link encircled by that pair of arms. The clevis pins are oriented with their heads projecting radially away from the tread surface.

An embodiment of an improvement to a tire chain of the kind having a plurality of interconnected links that cover a tire includes a plurality of twin clevises each having a receptacle in each pair of arms and a plurality of clevis pins each having a head on one of its extremities. Each clevis pin is removably disposed in a different one of the receptacles. Each twin clevis is secured to two of the links by the clevis pins. The twin clevises are oriented such that the heads of the clevis pins project radially away from a tread surface of a tire on which the tire chain is installed.

An embodiment of a method of extending the life of a tire chain includes installing twin clevises between links of the tire chain, removably installing clevis pins in the twin clevises, orienting the twin clevises such that, when the tire chain is installed on a tire, heads of the clevis pins project generally radially outward from a tread surface of the tire, and replacing the clevis pins when the heads wear. Removably installing a clevis pin may consist of installing a retaining clip carrying teeth on a recessed portion of the clevis pin such that the clip is compressed against the clevis pin during insertion of the clevis pin into the twin clevis, and when the clevis pin is fully inserted the clip expands, engaging the teeth to prevent the clevis pin from coming out. Or a retaining ring (E-clip) may be attached to the clevis pin, or the clevis pin may be secured with a cotter pin. In the case of a threaded clevis pin, the pin may be secured by screwing a threaded nut onto the clevis pin or screwing the pin into mating threads in the twin clevis.

This brief summary recites some aspects of the invention, but other novel and advantageous aspects will become apparent in the attached drawings and the following detailed description, illustrating by example the principles of the invention. The scope of the invention is to be determined by the claims as issued and not by whether a claim addresses any or all issues noted in the background or includes a feature included or not included in this summary.

DETAILED DESCRIPTION

This detailed description provides examples and does not limit the scope, applicability, or configurations in the claims as issued. Changes may be made in the function and arrangement of elements discussed without departing from the scope of the invention. Various embodiments may substitute, omit, or add procedures or components as appropriate, and features described with respect to some embodiments may be included in other embodiments.

Unless otherwise indicated, the terms "a" and "an" mean "at least one;" the words "including" and "having" are interchangeable with and mean the same as "comprising;" and the word "or" indicates a disjunctive use such that, for example, "A or B" means A or B or both.

Figure 1:
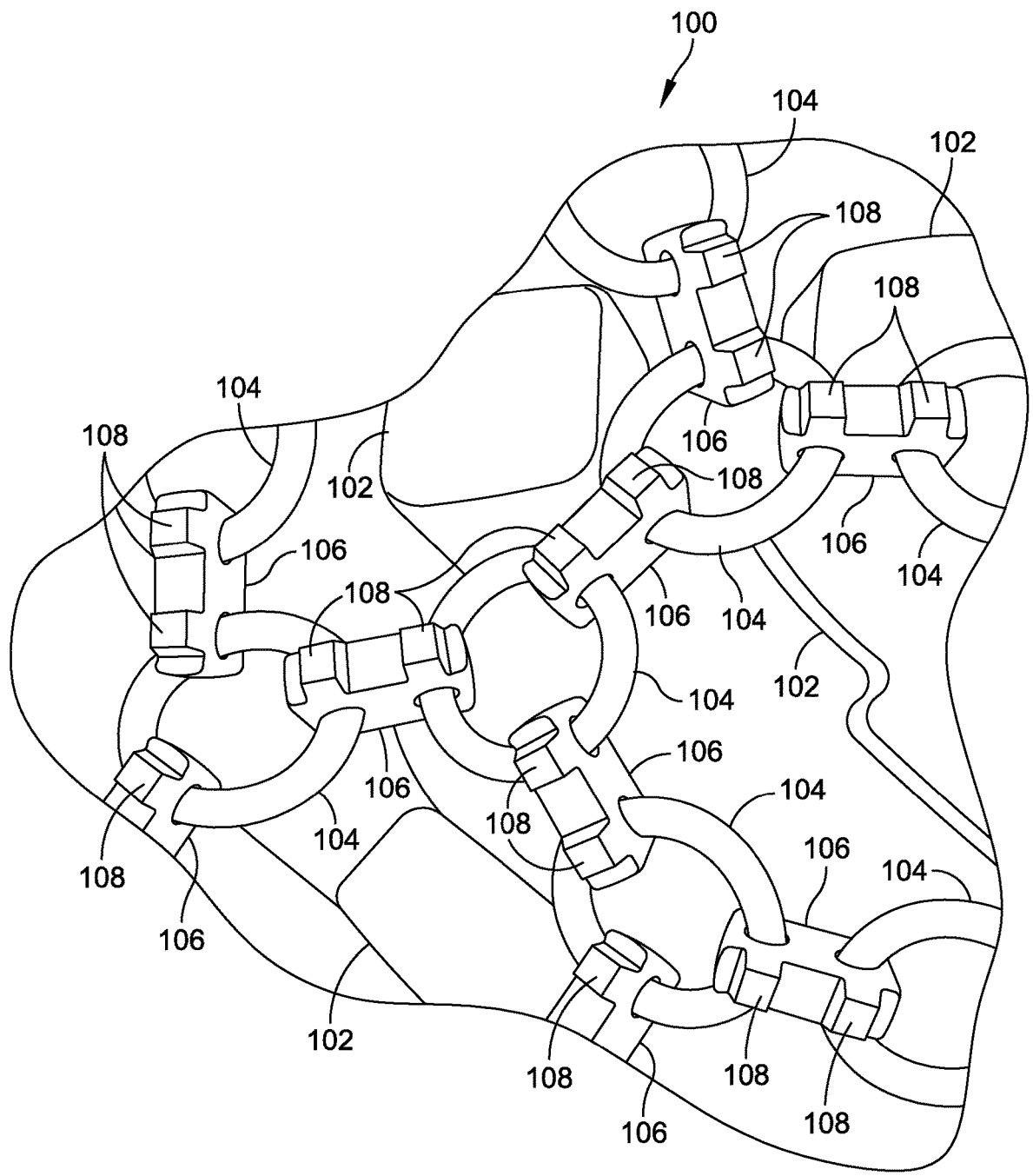
FIG. 1 is a perspective view of a portion of a prior-art tire chain installed on a tire.
Figure 2:
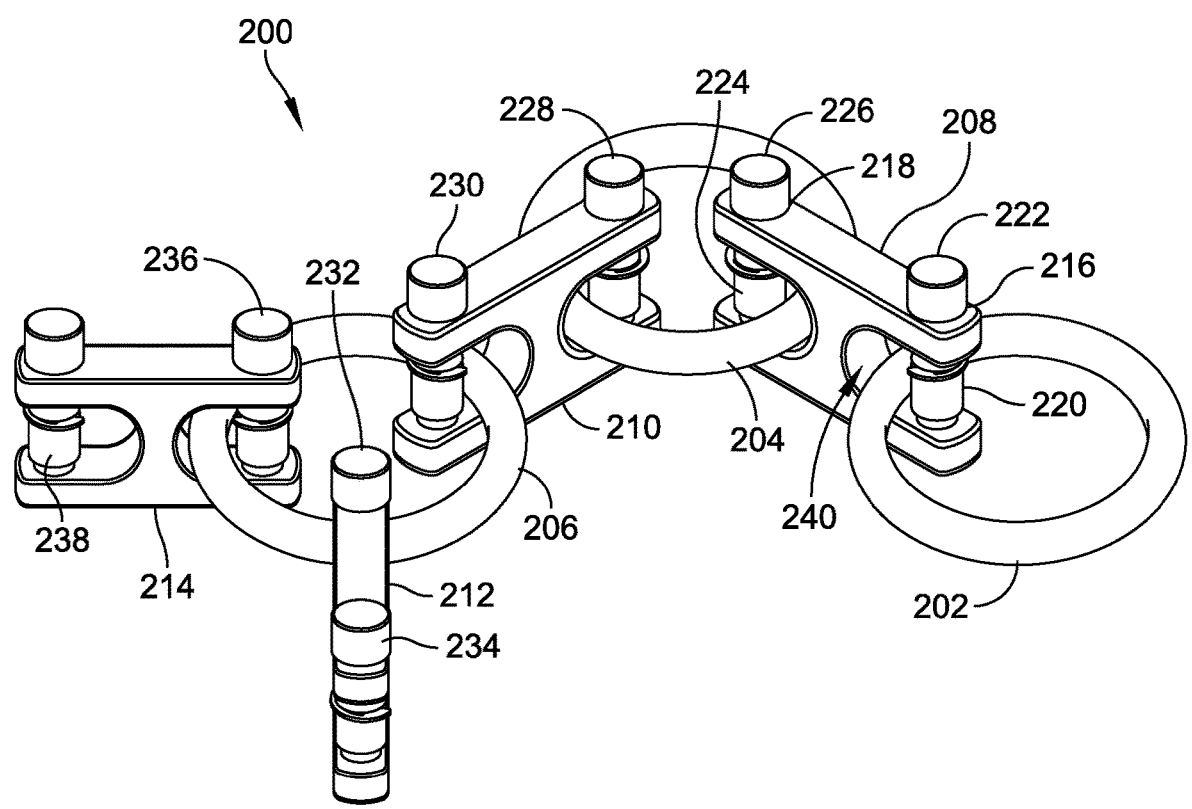
FIG. 2 is a perspective view of a portion of an embodiment of an extended-life tire chain.

As shown in FIG. 2, an embodiment of an extended-life tire chain generally 200 has a plurality of chain links 202, 204, and 206, and a plurality of twin clevises 208, 210, 212, and 214. Each twin clevis is secured to two of the links. In this example, the twin clevis 208 is secured to the links 202 and 204; the twin clevis 210 is secured to the links 204 and 206; the twin clevis 212 is secured to the link 206 and to another link (not shown); and the twin clevis 214 is secured to the link 206 and to another link (not shown). The twin clevis 208 has two receptacles 216 and 218. A clevis pin 220 having a head 222 on one of its extremities is removably disposed in the receptacle 216, and similarly a clevis pin 224 having a head 226 is removably disposed in the receptacle 218. In like manner the twin clevis 210 has clevis pins with heads 228 and 230 removably disposed in its receptacles, twin clevis 212 has clevis pins with heads 232 and 234 removably disposed in its receptacles, and twin clevis 214 has a clevis pin with head 236 removably disposed in one of its receptacles and clevis pin 238 removably disposed in the other of its receptacles.

The twin clevises 208, 210, 212, and 214 are oriented such that, when the tire chain 200 is installed on a tire (not shown in FIG. 2), the heads of the clevis pins project radially away from a tread surface of the tire.

Figure 3:
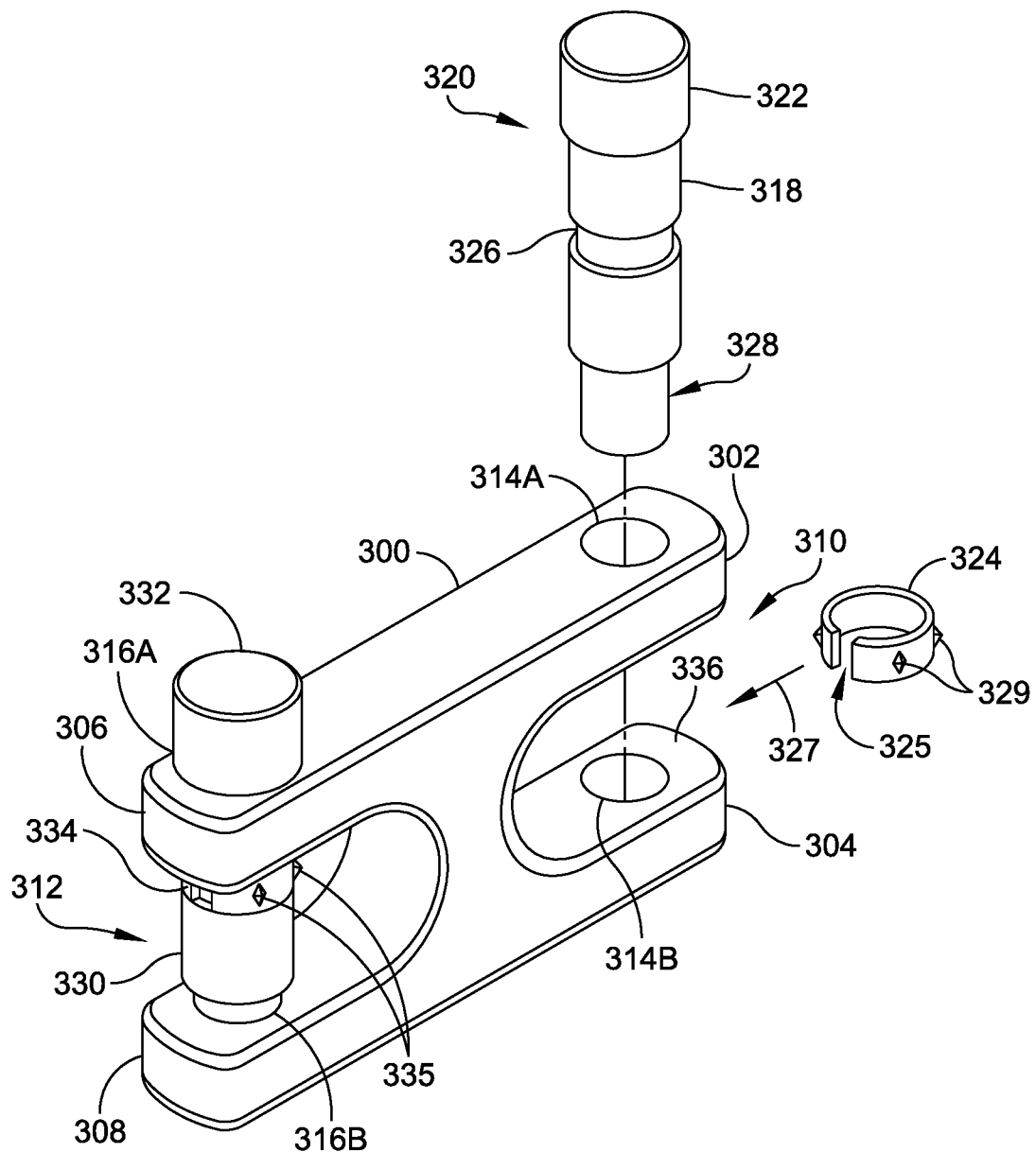
FIG. 3 is a partially-exploded perspective view of a twin clevis similar to the embodiment of FIG. 2 but showing the clevis pins secured with retaining rings.

As shown in FIG. 3, a twin clevis 300 similar to the twin clevises 208, 210, 212, and 214 has a first pair of arms 302 and 304 and a second pair of arms 306 and 308. A first U-shaped opening 310 is defined between the first pair of arms 302 and 304, and a second U-shaped opening 312 is defined between the second pair of arms 306 and 308. The arm 302 has a receptacle 314A extending through it, and similarly the arm 310 has a receptacle 316A extending through it.

Referring again to FIG. 2, each twin clevis encircles one of the chain links in one of its U-shaped openings and another of the chain links in the other of its U-shaped openings. For example, the twin clevis 208 encircles the chain link 202 in its U-shaped opening 240.

Figure 4:
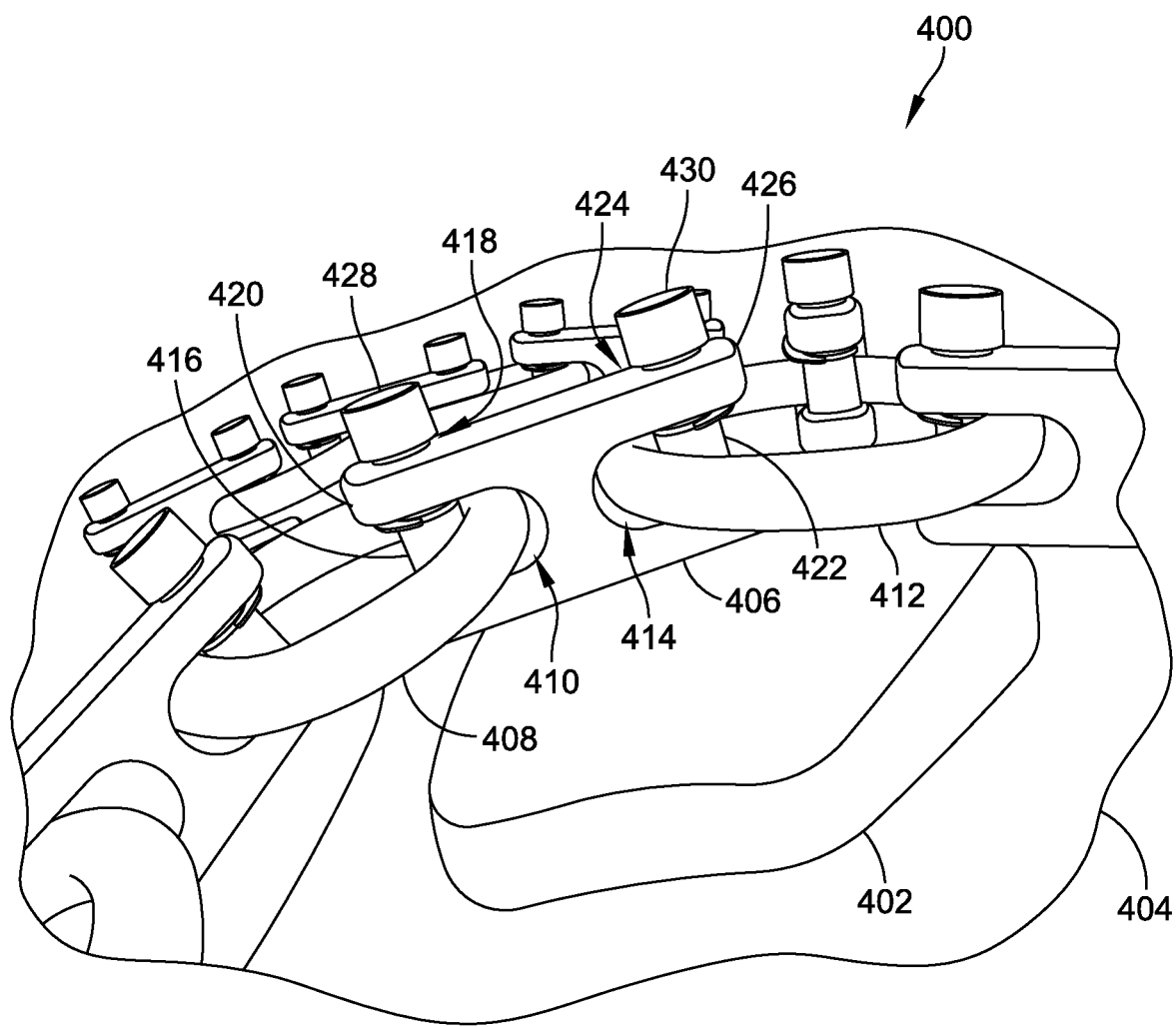
FIG. 4 is a perspective view of a portion of another embodiment of an extended-life tire chain.

Turning now to FIG. 4, twin clevises and chain links similar to those described above together define a tire chain structure 400 shaped to cover a tread surface 402 of a tire 404. A twin clevis 406 encircles a chain link 408 in its U-shaped opening 410 and a chain link 412 in its U-shaped opening 414. The chain links 408 and 412 are oriented generally parallel the tread surface 402 and the twin clevis 406 is oriented generally perpendicular to the tread surface 402. A clevis pin 416 is removably disposed in a receptacle 418 in an arm 420 of the twin clevis 406, and a clevis pin 422 is removably disposed in a receptacle 424 in an arm 426 of the twin clevis 406. The twin clevis 406 is oriented such that, when the tire chain 400 is installed on the tire 404, heads 428 and 430 of the clevis pins 416 and 422, respectively, project radially away from the tread surface 402 of the tire 404.

Referring again to FIG. 3, a clevis pin 318 has a first extremity 320 with a head 322. The clevis pin 318 is inserted into the receptacle 314A in the arm 302 of the twin clevis 300 and is held in place by a spring retainer clip 324 that clips around a groove 326 in the clevis pin 318. The spring retainer clip 324 has a gap 325 that allows it to expand when slipped onto the clevis pin 318. The retainer clip 324 may be slipped onto the clevis pin 318 by, for example, positioning the retainer clip 324 in the U-shaped opening 310 and sliding the clevis pin 318 through the receptacle 314A and the retainer clip 324. Or if the retainer clip 324 is sufficiently elastic, it may be spread open, widening the gap 325, and then clipped over the clevis pin 318 after the clevis pin 318 has been inserted into the receptacle 314A as suggested by an arrow 327. The retainer clip 324 carries a plurality of pins 329 that prevent it, and the clevis pin 318, from sliding back up out of the receptacle 314A. A second extremity 328 of the clevis pin 318 enters into a receptacle 314B in the arm 304. In this way a chain link may be secured in the U-shaped opening 310 by the clevis pin 318. The second extremity 328 is shown in FIG. 3 as having a smaller diameter than the remainder of the clevis pin 318, but in some embodiments (as shown in FIG. 5) the entire clevis pin has a constant diameter (except for the head 322 and the groove 326).

In similar manner a clevis pin 330 with a head 332 is inserted into receptacle 316A in the arm 306 and receptacle 316B in the arm 308 and held in place by a spring retaining clip 334 having a gap (not shown) and pins 335.

The receptacles 314A and 314B may be considered as a single receptacle extending through both arms 302 and 304 to receive the clevis pin 318. In some embodiments the receptacle 314B extends only part way through the arm 304 and is formed as a cup to receive the second extremity 328 of the clevis pin 318. In other embodiments the receptacle 314B is entirely omitted and the clevis pin 318 is inserted through the receptacle 314A such that the second extremity 328 rests on or is adjacent to a surface 336 of the arm 304. Similarly, the receptacles 316A and 316B may be considered as a single receptacle extending through the arms 306 and 308 to receive the clevis pin 330; in some embodiments the receptacle 316B may be entirely absent or may extend only part way through the arm 308.

Figure 5A:
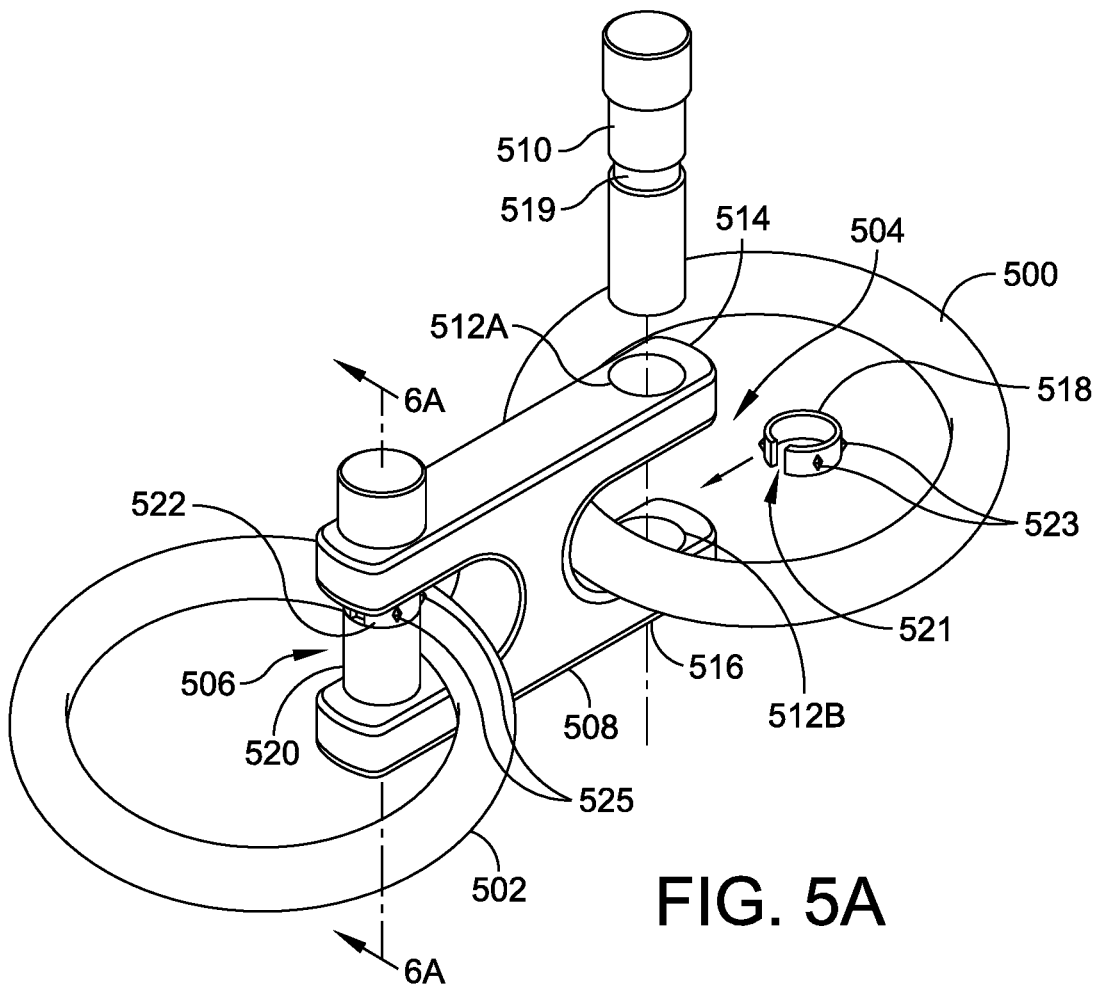
FIG. 5A is a partially-exploded perspective view of the twin clevis of FIG. 3 with chain links disposed between arms of the twin clevis.
Figure 6A:
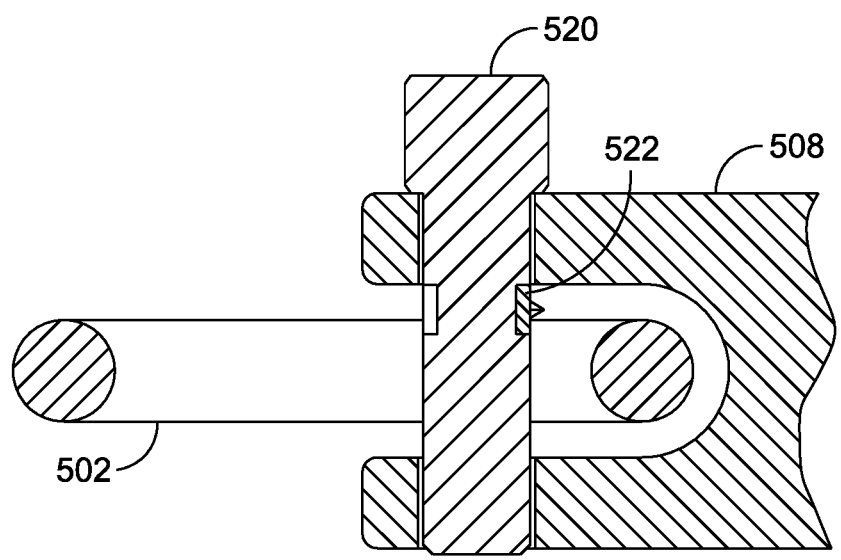
FIG. 6A is a sectional view taken along the line 6A-6A of FIG. 5A.

FIGS. 5A and 6A are similar to FIG. 3 but show chain links 500 and 502 disposed in the U-shaped openings 504 and 506 of twin clevis 508. The chain link 500 will be secured by a clevis pin 510 when the clevis pin 510 is inserted into receptacles 512A and 512B in arms 514 and 516, respectively. The clevis pin 510 is retained in position by a spring retaining clip 518 clipped onto the clevis pin 510 in a groove 519. The spring retaining clip 518 has a gap 521 similar to the gap 325 and a plurality of pins 523 similar to the pins 329. Similarly, the chain link 502 is secured in the U-shaped opening 506 by a clevis pin 520. A spring retaining clip 522 with pins 525 holds the clevis pin 520 in place.

In some embodiments the groove 519 is omitted and the clevis pins 510 and 520 are held in place by tight clamping of the retaining clip 518 onto the clevis pins 510 and 520, respectively. In these embodiments the retaining clip 518 would not be disposed partially in the receptacle 512A but instead would be clamped onto the clevis pin 510 in the U-shaped opening 504, and the retaining clip 522 would be similarly disposed on the clevis pin 520.

Figure 5B:
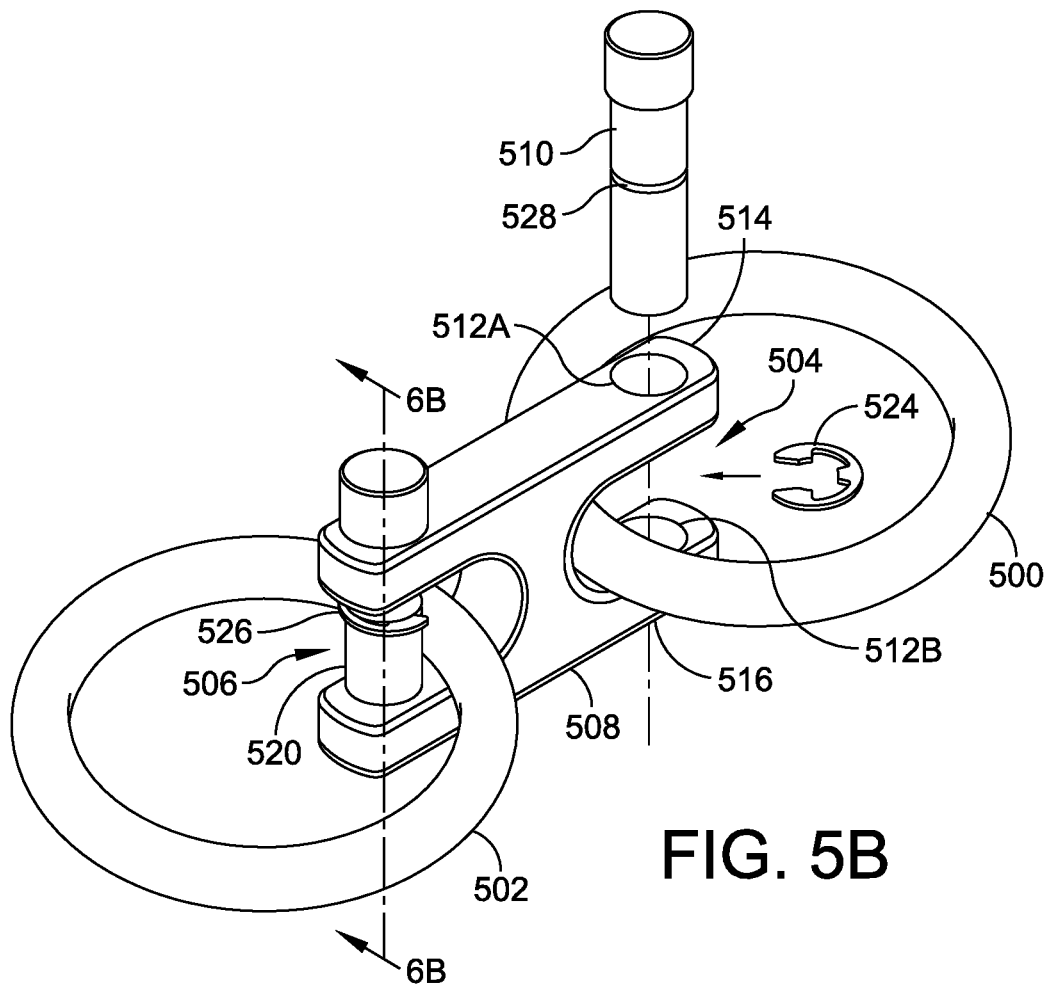
FIG. 5B is similar to FIG. 5A but shows E-clips rather than C-clips retaining the clevis pins.
Figure 6B:
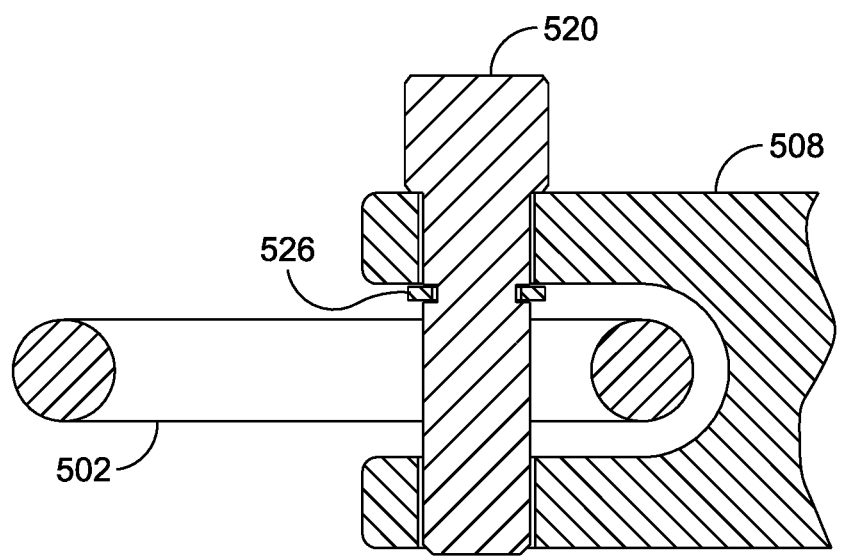
FIG. 6B is similar to FIG. 6A but is taken along the line 6B-6B of FIG. 5B.

FIGS. 5B and 6B depict an embodiment similar to that show in FIGS. 5A and 6A, except that an E-clip 524 is used rather than the spring retainer clip 518 to retain the clevis pin 510, and an E-clip 526 is used rather than the retainer clip 522 to retain the clevis pin 520. In this embodiment a narrow groove 528, to receive the E-clip 524, is cut into the clevis pin 510 rather than the groove 519 which must be wide enough to accommodate the retainer clip 518.

In the foregoing embodiments the heads of the clevis pins are oriented to project away from the tire tread toward the road and contact the road surface. When the clevis pins wear, they can easily be replaced, avoiding the time and expense of replacing the entire tire chain when the clevis pins have broken or the heads of the clevis pins have worn.

Figure 7:
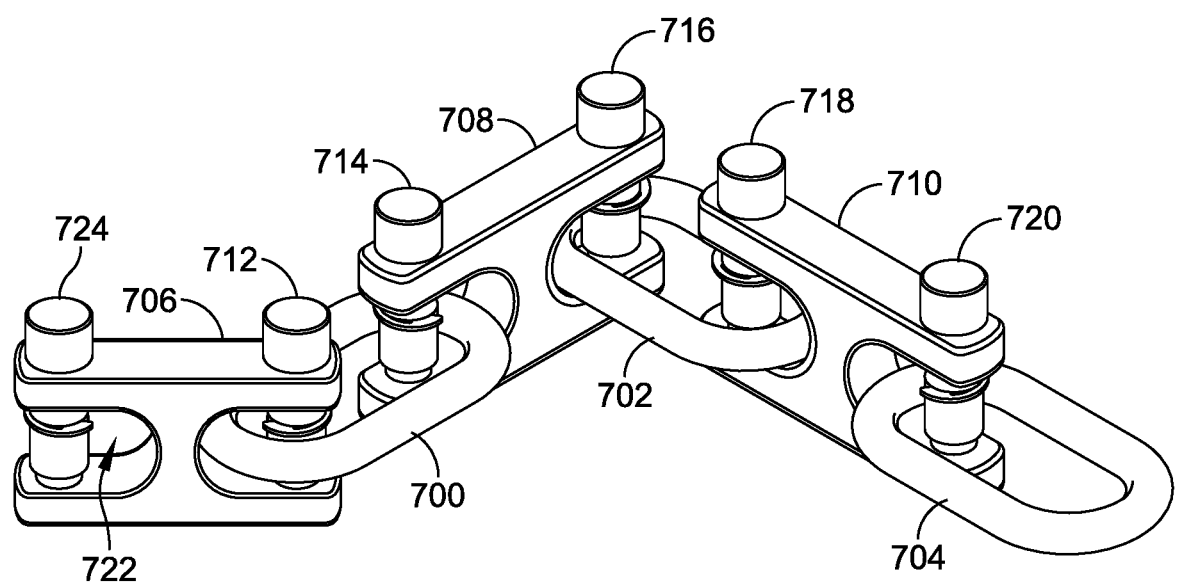
FIG. 7 is a perspective view of a plurality of twin clevises and chain links according to another embodiment.

An existing tire chain can be improved by adding twin clevises similar to those described above. FIG. 7 shows a portion of an existing tire chain having chain links 700, 702, and 704. Twin clevises 706, 708, and 710 are added to the tire chain. Twin clevises 706 and 708 are secured to chain link 700 by removable clevis pins 712 and 714, respectively. Twin clevises 708 and 710 are secured to chain link 702 by removable clevis pins 716 and 718, respectively. Twin clevis 710 is secured to chain link 704 by removable clevis pin 720, and so on for other chain links and twin clevises. For example, a chain link (not shown) may be secured in a U-shaped opening 722 of the twin clevis 706 by a removable clevis pin 724.

In the embodiment shown in FIG. 7, the existing chain links 700, 702, and 704 are oblong rather than round. The shape of the chain links is not critical, and this or any of the foregoing embodiments could easily be implemented with chain links having oval, square, rectangular, or other shapes instead of the round and oblong shapes illustrated in FIG. 2 through FIG. 7.

Figure 8:
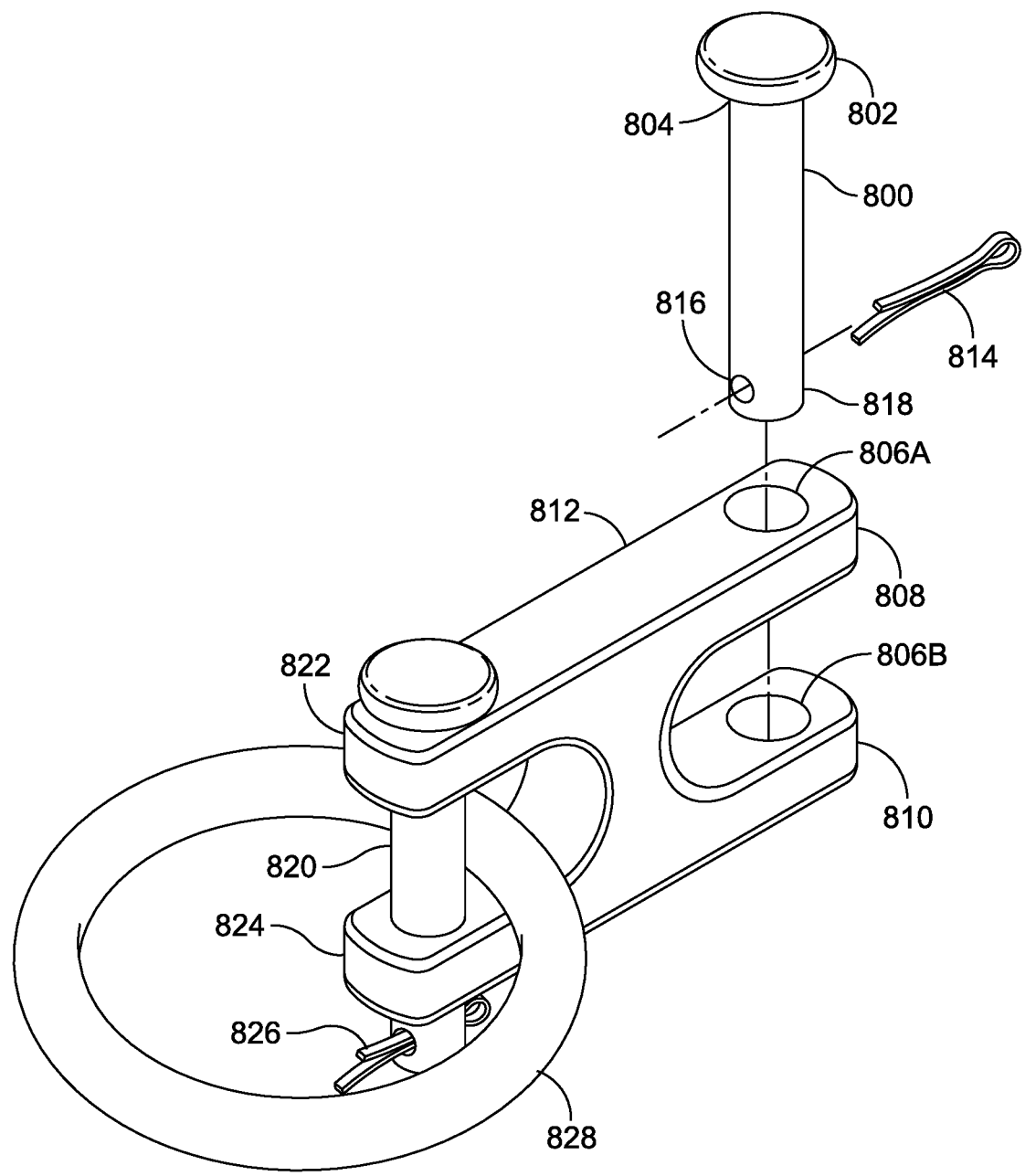
FIG. 8 is a partially-exploded perspective view of a twin clevis and a chain link according to another embodiment.

In the embodiments described above, the clevis pins are held in place by spring retainer clips or in some embodiments by E-clips, facilitating quick and easy replacement of the clevis pins as they wear. But the clevis pins can be secured in any manner that facilitates quick removal and replacement of the clevis pins. For example, FIG. 8 shows an embodiment in which a clevis pin 800 having a head 802 on a first extremity 804 is held in place in receptacles 806A and 806B in arms 808 and 810, respectively, of a twin clevis 812 by a cotter pion 814 inserted through an opening 816 in a second extremity 818 of the clevis pin 800. Another clevis pin 820 is held in place in arms 822 and 824 of the twin clevis 808 by a cotter pin 826, securing a chain link 828 between the arms 822 and 824. A clevis pin can be quickly and easily secured in place with a cotter pin by inserting the cotter pin through the opening in the second extremity of the clevis pin and then bending the cotter pin with the fingers or a pliers or other convenient tool. A worn clevis pin can be removed by un-bending the cotter pin or by cutting it off.

Figure 9:
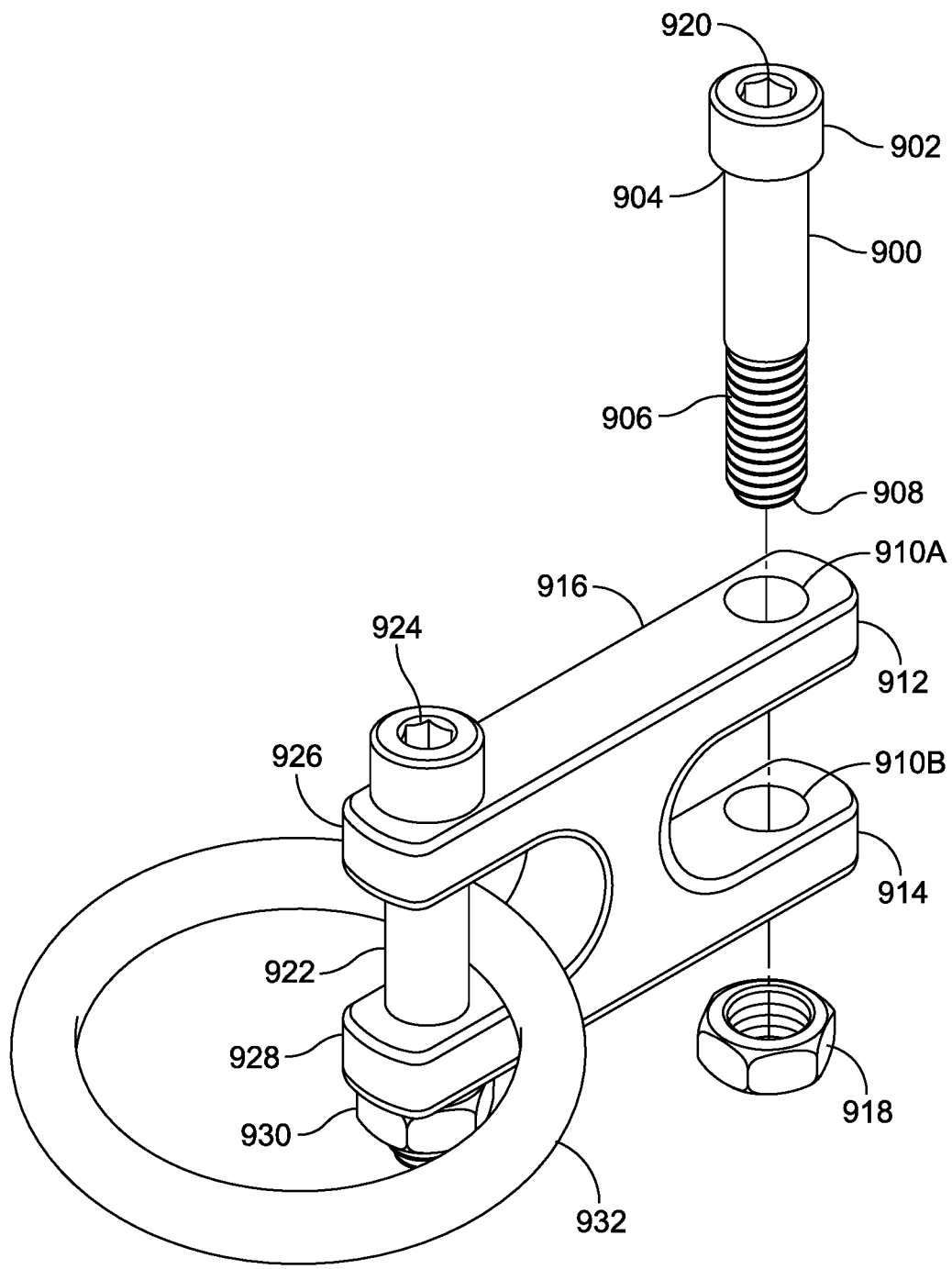
FIG. 9 is a partially-exploded perspective view of a twin clevis and a chain link according to another embodiment.

FIG. 9 shows an embodiment in which a clevis pin comprises a threaded bolt 900 with a head 902 on a first extremity 904 and threads 906 cut into a second extremity 908. The clevis pin is held in place in receptacles 910A and 910B in arms 912 and 914, respectively, of a twin clevis 916 by a complementary threaded hex nut 918. In this embodiment the head 902 has a hexagonal indent 920 shaped to accommodate an Allen wrench. Another clevis pin 922, also with an indent 924 to accommodate an Allen wrench, is held in place in arms 926 and 928 by a nut 930, securing a chain link 932 between the arms 926 and 928 of the twin clevis 916.

Figure 10:
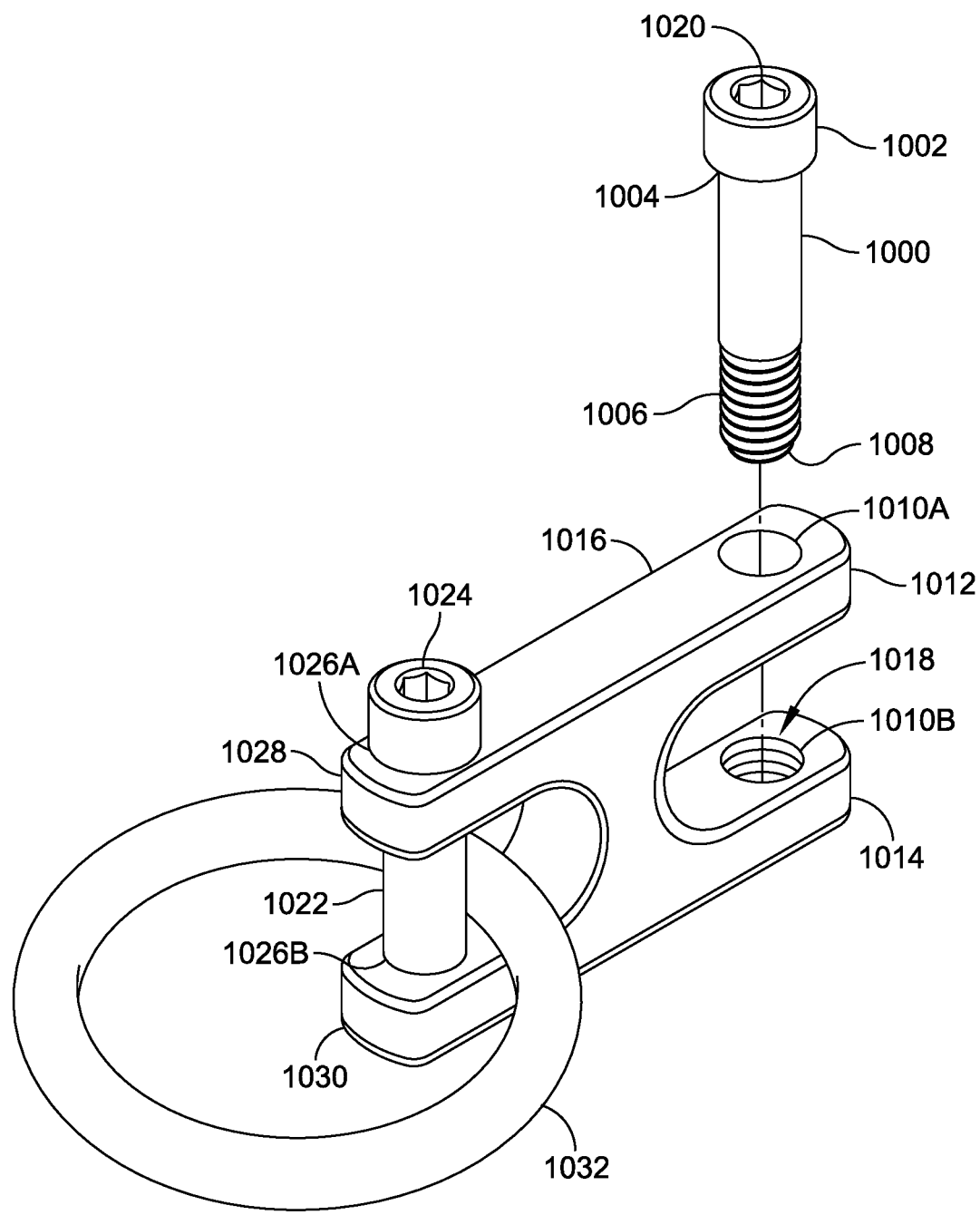
FIG. 10 is a partially-exploded perspective view of a twin clevis and a chain link according to another embodiment.

FIG. 10 shows an embodiment in which a clevis pin 1000, similar to the clevis pin 900, has a head 1002 on a first extremity 1004 and threads 1006 cut into a second extremity 1008. The clevis pin 1000 is held in place in a receptacle 1010A and 1010B in arms 1012 and 1014, respectively, of a twin clevis 1016 by being screwed into the receptacle 1010B in which complementary internal threads 1018 have been cut. The head 1002 has a hexagonal indent 1020 shaped to accommodate an Allen wrench. Another clevis pin 1022, also with an indent 1024 to accommodate an Allen wrench, is inserted through receptacles 1026A and 1026B in arms 1028 and 1030 by being screwed into internal threads (not visible in the drawing) in the receptacle 1026B, securing a chain link 1032 between the arms 1028 and 1030 of the twin clevis 1016.

Figure 11:
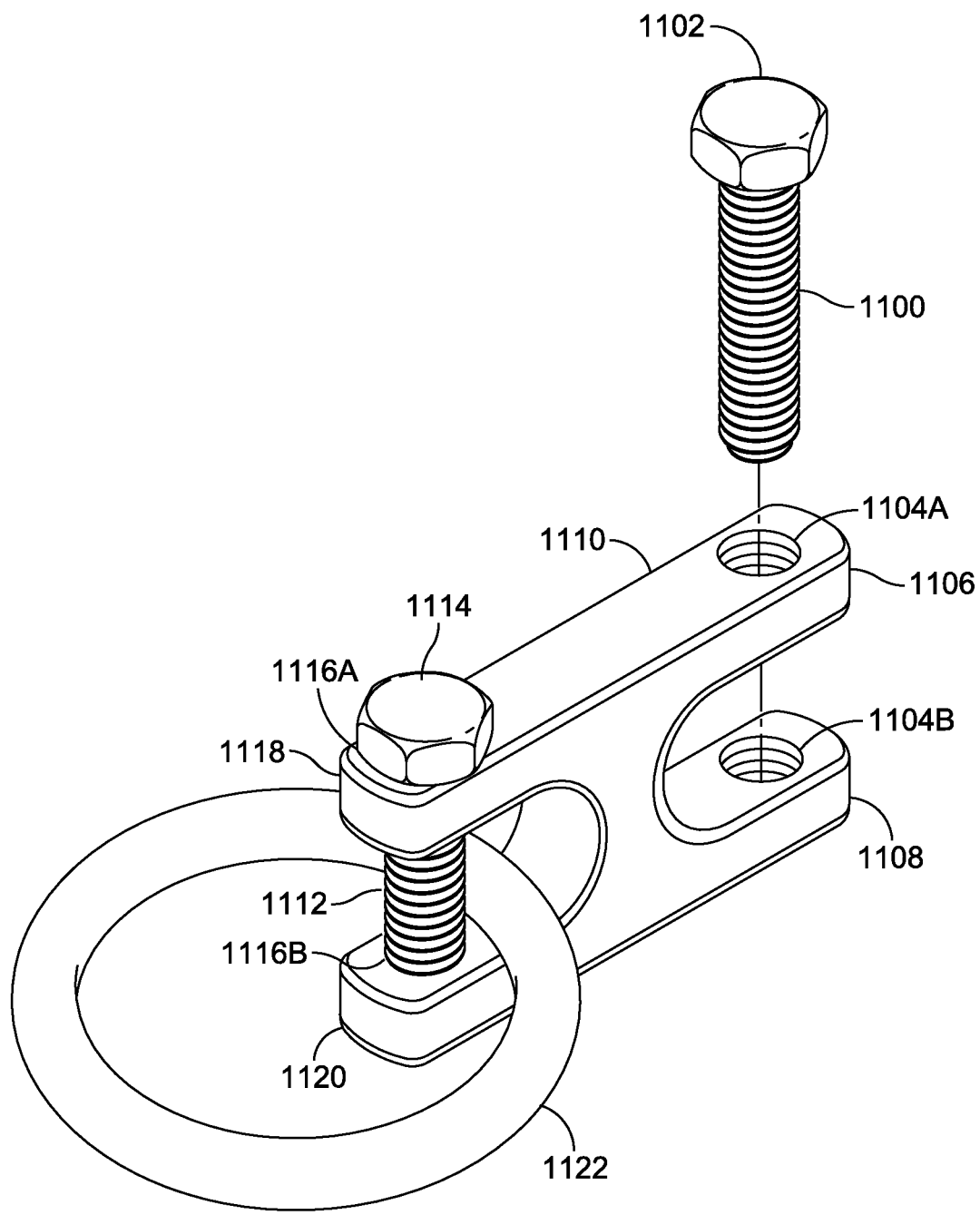
FIG. 11 is a partially-exploded perspective view of a twin clevis and a chain link according to another embodiment.

FIG. 11 shows an embodiment in which a clevis pin 1100 comprises a bolt threaded along its entire length. This clevis pin 1100 has a hex head 1102 that facilitates installation and removal by a socket wrench, a crescent wrench, a pliers, or other similar tool. The clevis pins shown in FIGS. 9 and 10 could also have hex heads rather than Allen-wrench heads. Indeed, the heads of the clevis pins could instead be fabricated to accommodate a square drive, a star drive, a Phillips screwdriver, or any other desired tool that would enable convenient removal and installation of the clevis pin. The clevis pin 1100 is screwed into receptacles 1104A and 1104B in arms 1106 and 1108, respectively, in a twin clevis 1110. In this embodiment complementary internal threads are cut into both the receptacles 1104A and 1104B, but in other embodiments the threads may be cut only into the receptacle 1104A in the arm 1106, and in such embodiments the clevis pin may extend into the receptacle 1104B. Indeed, the receptacle 1104B may not go all the way through the arm 1108 or may be omitted entirely, as described above with reference to FIG. 3. Another clevis pin 1112 having hex head 1114 is screwed into internal threads in receptacles 1116A and 1116B in arms 1118 and 1120, securing a chain link 1122 between the arms 1118 and 1120 of the twin clevis 1110.

Figure 12A:
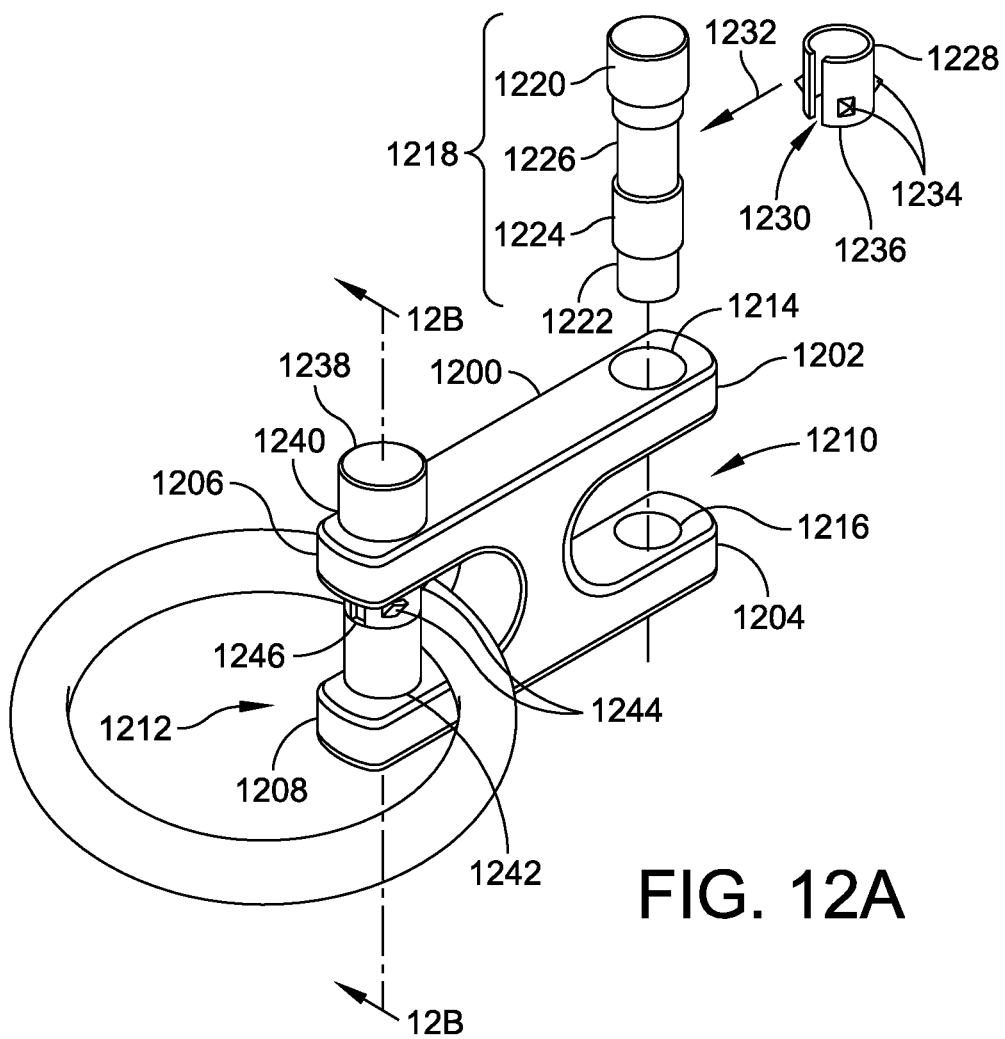
FIG. 12A is a is a partially-exploded perspective view of another embodiment of a twin clevis with the clevis pins secured with spring retainer clips having teeth that hold the clevis pins in place.

Another embodiment of a twin clevis is shown in FIG. 12A. A twin clevis 1200 has a first pair of arms 1202 and 1204 and a second pair of arms 1206 and 1208. A first U-shaped opening 1210 is defined between the first pair of arms 1202 and 1204, and a second U-shaped opening 1212 is defined between the second pair of arms 1206 and 1208. The arm 1202 has a receptacle 1214 extending through it, and similarly the arm 1204 has a receptacle 1216 extending through it.

A clevis pin generally 1218 has proximal and distal extremities 1220 and 1222 and a shank 1224 intermediate the proximal and distal extremities. The proximal extremity 1220 has a larger circumference than the remaining sections of the clevis pin to define a head of the clevis pin. A portion of the shank has a smaller circumference to define a channel 1226 in the shank. The distal extremity 1222 may be tapered or may have the same or a smaller circumference than other sections of the shank.

A retainer clip 1228 has a gap 1230 that allows it to expand and spread open, widening the gap 1230 for clipping the retainer clip into the channel 1226 on the clevis pin 1218, as indicated by an arrow 1232. When clipped into the channel 1226, the retainer clip partially or fully encircles the clevis pin. The retainer clip carries a plurality of teeth 1234 disposed about its distal extremity 1236. These teeth may be integrally formed in the retainer clip or attached to it by any convenient means. In some embodiments the teeth may be carried directly by the clevis pin without use of a retainer clip. The retainer clip, the teeth, or both may be made of spring steel or other suitable material.

The clevis pin 1218 carrying the retainer clip 1228 is inserted into and through the receptacle 1214 in the arm 1202 of the twin clevis 1200. Insertion of the clevis pin into the receptacle forcibly compresses the entire retainer clip against the clevis pin, permitting the clevis pin and retainer clip to enter the receptacle 1214. As the distal extremity 1222 of the clevis pin enters the receptacle 1216, the head of the clevis pin contacts the clevis 1200 and the teeth pop up, retaining the clevis pin from backing out of the receptacle 1214. In this way a chain link may be secured in the U-shaped opening 1210 by the clevis pin 1218. The second extremity 1222 is shown as having a smaller circumference than the remainder of the clevis pin 1218, but in some embodiments the entire clevis pin has a constant diameter (except for the head and the channel 1226).

In similar manner a clevis pin 1238 is inserted through a receptacle 1240 in the arm 1206 and into a receptacle 1242 in the arm 1208. The clevis pin 1238 is held in place by teeth 1244 carried by or formed integrally in a retaining clip 1246.

Figure 12B:
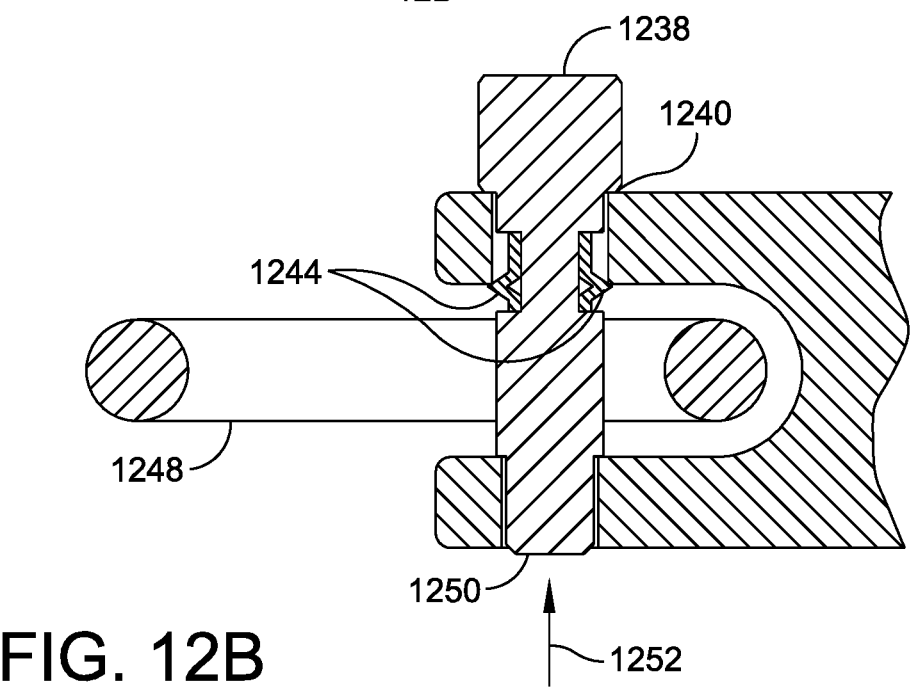
FIG. 12B is a section view taken along the line 12A-12A of FIG. 12.

FIG. 12B shows a chain link 1248 disposed in the U-shaped opening 1212 and retained in place by the clevis pin 1238.

If the clevis pin 1238 wears or breaks, it can be removed from the clevis 1200 by pulling on the head with any suitable tool, automatically compressing the entire retainer clip 1228 against the clevis pin, or by forcibly striking a distal end 1250 of the clevis pin with a hammer or the like through the receptacle 1242 as indicated by an arrow 1252.

Figure 13:
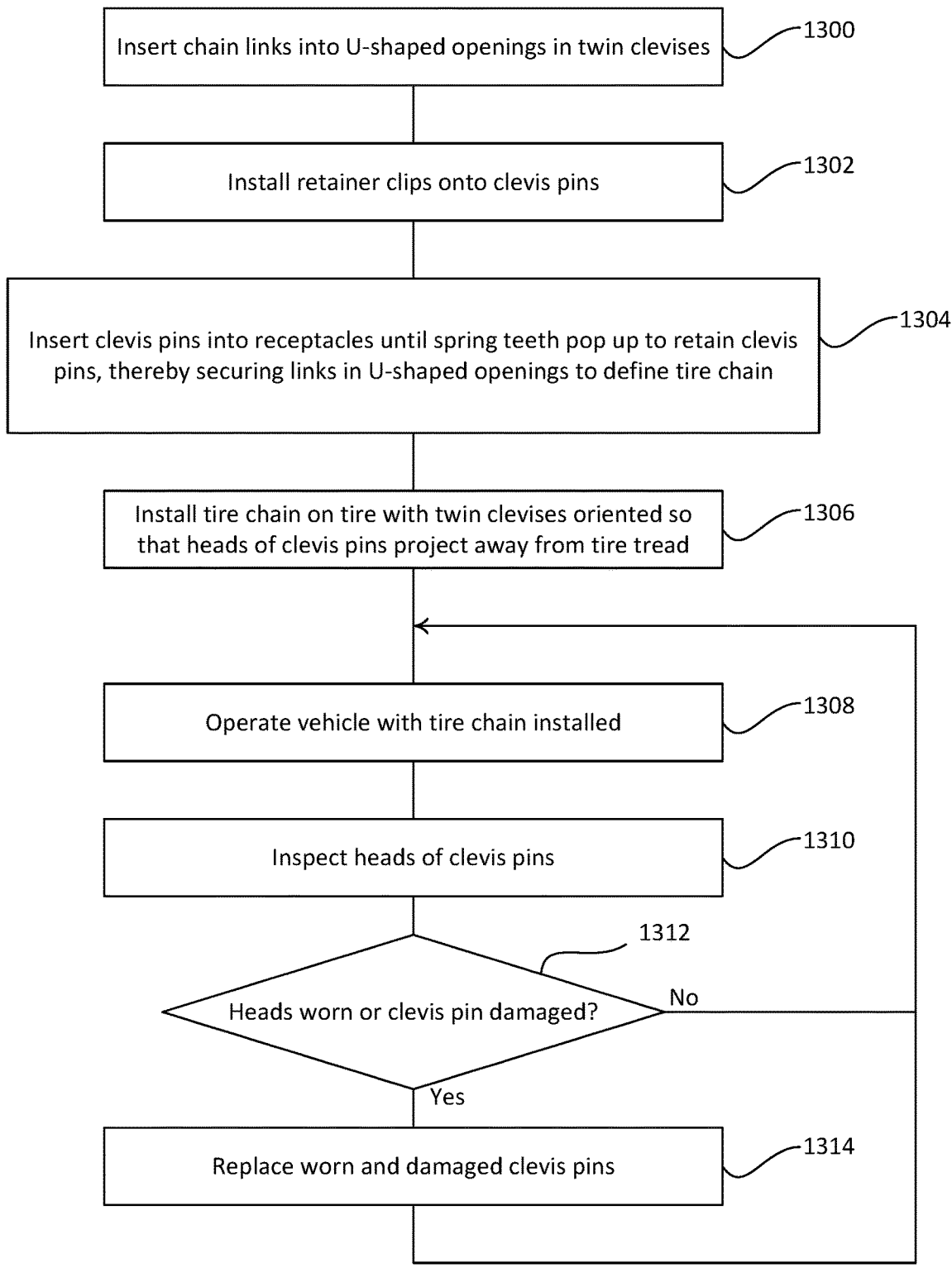
FIG. 13 is a flowchart of an embodiment of a method of extending the life of a tire chain.

FIG. 13 depicts in flow-chart form a method of extending the life of a tire chain. The method includes inserting chain links into U-shaped openings in twin clevises (1300), installing retainer clips onto clevis pins (1302), inserting clevis pins into receptacles until teeth pop up to retain clevis pins, thereby securing the chain links in the U-shaped openings of the twin clevises to define a tire chain (1304), installing the tire chain on a tire with the twin clevises oriented so that the heads of the clevis pins project away from the tire tread (1306), operating the vehicle with the tire chain installed (1308), from time to time inspecting the heads of the clevis pins (1310), if any of the heads are worn or any of the clevis pins are damaged (1312) replacing them (1314), and continuing to operate the vehicle with the tire chain installed.

The process parameters, functions, features, and sequences of steps described or illustrated are given by way of example and may be varied, mixed, and matched. The exemplary methods may omit one or more steps or include additional steps. The illustrative embodiments as described and illustrated are not intended to be exhaustive or to limit the invention to the precise forms disclosed. Modifications and variations are possible. The embodiments were chosen to explain the principles of the apparatus and methods and their practical applications. Accordingly, the disclosure is to be limited only by the claims as finally allowed.

I claim:

1. An extended-life tire chain comprising:
   a plurality of chain links mountable to abut the tread surface of a tire;
   a plurality of pairs of twin clevises, with at least a first pair of twin clevises having:
      (i) a first twin clevis attached to a first section of a chain link in the plurality of chain links; and
      (ii) a second twin clevis attached to a second section of the chain link in the plurality of chain links, each twin clevis having two clevis pin receptacles; and
   a plurality of clevis pins each having a head on one of its extremities, each clevis pin receptacle having a clevis pin removably disposed in the clevis pin receptacle, each of the twin clevises oriented such that, when the tire chain is installed on a tire, the heads project radially away from a tread surface of the tire.

2. The tire chain of claim 1 and further comprising spring retaining clips securing the clevis pins in the receptacles.

3. The tire chain of clam 1 and further comprising a plurality of spring retaining clips each carrying a plurality of teeth, each retaining clip disposed on a different one of the clevis pins with the teeth oriented to oppose removal of that clevis pin from its receptacle.

4. The tire chain of claim 1 wherein each clevis pin carries a plurality of teeth oriented to oppose removal of that clevis pin from its receptacle.

5. The tire chain of claim 1 and further comprising E-clips securing the clevis pins in the receptacles.

6. The tire chain of claim 1 and further comprising cotter pins securing the clevis pins in the receptacles.

7. The tire chain of claim 1 wherein the clevis pins comprise threaded bolts, and further comprising one of complementary internal threads in one of the receptacles and complementary nuts securing the clevis pins in the receptacles.

8. An extended-life tire chain comprising: a plurality of chain links; a plurality of pairs of twin clevises, with at least a first pair of twin clevises having: (i) a first twin clevis attached to a first section of a chain link in the plurality of chain links; and (ii) a second twin clevis attached to a second section of the chain link in the plurality of chain links, each clevis having two pairs of arms, each pair of arms defining therebetween a U-shaped opening, at least one arm of each pair having therethrough a receptacle, each twin clevis encircling one of the chain links in one of its U-shaped openings and another of the chain links in the other of its U-shaped openings such that the twin devises and chain links together define a tire chain structure shaped to cover a tread surface of a tire, the chain links oriented generally parallel to the tread surface and the twin devises oriented generally perpendicular to the tread surface; and a plurality of clevis pins each having a head on one of its extremities, each clevis pin removably disposed in a receptacle in a different one of the pairs of arms to retain a chain link encircled by that pair of arms, the clevis pins oriented with their heads projecting radially away from the tread surface.

9. The tire chain of claim 8 and further comprising spring retaining clips securing the clevis pins to the twin clevises.

10. The tire chain of clam 8 and further comprising a plurality of spring retaining clips each carrying a plurality of teeth, each retaining clip disposed on a different one of the clevis pins with the teeth oriented to retain that clevis pin in its receptacle.

11. The tire chain of claim 8 wherein each clevis pin carries a plurality of teeth oriented to oppose removal of that clevis pin from its receptacle.

12. The tire chain of claim 8 and further comprising E-clips securing the clevis pins to the twin clevises.

13. The tire chain of claim 8 and further comprising cotter pins securing the clevis pins to the twin clevises.

14. The tire chain of claim 8 wherein the clevis pins comprise threaded bolts, and further comprising one of complementary internal threads in one of the receptacles and complementary nuts securing the clevis pins in the receptacles.

15. An improvement to a tire chain of the kind having a plurality of interconnected links that encircle a tire, the improvement comprising: a plurality of pairs of twin clevises, with at least a first pair of twin clevises having: (i) a first twin clevis attached to a first section of a chain link in the plurality of chain links; and (ii) a second twin clevis attached to a second section of the chain link in the plurality of chain links each clevis having at least two receptacles, each twin clevis secured to two of the links; and a plurality of clevis pins each having a head on one of its extremities, each clevis pin removably disposed in a different one of the receptacles, the twin devises oriented such that, when the tire chain covers a tire, the heads project radially away from a tread surface of the tire.

16. The tire chain of claim 15 and further comprising spring retaining clips securing the clevis pins in the receptacles.

17. The tire chain of clam 15 and further comprising a plurality of spring retaining clips each carrying a plurality of teeth, each retaining clip disposed on a different one of the clevis pins with the teeth oriented to retain that clevis pin in its receptacle.

18. The tire chain of claim 15 wherein each clevis pin carries a plurality of teeth oriented to oppose removal of that clevis pin from its receptacle.

19. The tire chain of claim 15 and further comprising E-clips securing the clevis pins in the receptacles.

20. The tire chain of claim 15 and further comprising cotter pins securing the clevis pins in the receptacles.

21. The tire chain of claim 15 wherein the clevis pins comprise threaded bolts, and further comprising one of complementary internal threads in one of the receptacles and complementary nuts securing the clevis pins in the receptacles.

\* \* \* \* \*

UNITED STATES PATENT AND TRADEMARK OFFICE
CERTIFICATE OF CORRECTION

PATENT NO. : 12,122,197 B2
APPLICATION NO. : 17/024390
DATED : October 22, 2024
INVENTOR(S) : Tim Ruppert Page 1 of 1

It is certified that error appears in the above-identified patent and that said Letters Patent is hereby corrected as shown below:

In the Claims

Claim 8, Column 9, Lines 24-27 should read:
"U-shaped openings such that the twin clevises and chain links together define a tire chain structure shaped to cover a tread surface of a tire, the chain links oriented generally parallel to the tread surface and the twin clevises oriented"

Claim 15, Column 10, Line 21 should read:
"the twin clevises oriented such that, when the tire chain"

Signed and Sealed this
Twenty-fifth Day of March, 2025

Coke Morgan Stewart
*Acting Director of the United States Patent and Trademark Office*